(12) United States Patent
Caspi

(10) Patent No.: US 7,257,769 B2
(45) Date of Patent: Aug. 14, 2007

(54) SYSTEM AND METHOD FOR INDICATING AN ANNOTATION FOR A DOCUMENT

(75) Inventor: Rami Caspi, Sunnyvale, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 384 days.

(21) Appl. No.: 10/456,336

(22) Filed: Jun. 5, 2003

(65) Prior Publication Data

US 2004/0250201 A1    Dec. 9, 2004

(51) Int. Cl.
*G06F 17/00* (2006.01)

(52) U.S. Cl. ............ 715/512; 715/526; 715/715; 715/727; 715/751; 715/808

(58) Field of Classification Search ............ 715/512, 715/715, 727, 729, 730, 751, 808–810, 864; 345/864; 709/204; 704/270
See application file for complete search history.

(56) References Cited

U.S. PATENT DOCUMENTS

| | | | | |
|---|---|---|---|---|
| 5,481,645 A | | 1/1996 | Bertino et al. .......... 704/270 |
| 5,502,727 A | | 3/1996 | Catanzaro et al. ...... 370/271 |
| 5,537,526 A | * | 7/1996 | Anderson et al. ....... 715/515 |
| 5,649,104 A | | 7/1997 | Carleton et al. ........ 709/204 |
| 5,671,428 A | | 9/1997 | Muranaga et al. ...... 715/751 |
| 5,826,025 A | | 10/1998 | Gramlich ............... 709/217 |
| 5,838,313 A | * | 11/1998 | Hou et al. ............ 715/500.1 |
| 5,845,301 A | * | 12/1998 | Rivette et al. .......... 715/512 |
| 5,893,126 A | | 4/1999 | Drews et al. ........... 715/512 |
| 6,041,335 A | | 3/2000 | Merritt et al. .......... 715/512 |
| 6,119,147 A | * | 9/2000 | Toomey et al. ........ 709/204 |
| 6,230,171 B1 | * | 5/2001 | Pacifici et al. ......... 715/512 |
| 6,279,014 B1 | * | 8/2001 | Schilit et al. .......... 715/512 |
| 6,546,405 B2 | | 4/2003 | Gupta et al. ........... 715/512 |
| 6,687,878 B1 | * | 2/2004 | Eintracht et al. ....... 715/512 |
| 6,859,909 B1 | * | 2/2005 | Lerner et al. .......... 715/512 |
| 2002/0099552 A1 | * | 7/2002 | Rubin et al. ........... 704/270 |
| 2002/0116420 A1 | * | 8/2002 | Allam et al. .......... 707/526 |
| 2004/0034832 A1 | * | 2/2004 | Taylor et al. .......... 715/512 |
| 2004/0201633 A1 | * | 10/2004 | Barsness et al. ........ 345/864 |
| 2004/0267693 A1 | * | 12/2004 | Lowe et al. ............ 707/1 |

OTHER PUBLICATIONS

Heck et al.,"A Survey of Web Annotation Systems", Dept. of Math and Comp. Sci, Grinnell College, 1999 pp. 1-6.*
Roscheisen et al.,"Interaction Design for Shared World-Wide Web Annotations", 1995, ACM.*
Denoue et al,"An Annotation Tool For Web Browsers and its Applications to Information Retrieval", 2000 16 pages.*
Yee,"CritLink: Advanced Hyperlinks Enable Public Annotation on the Web", Univ. Cal. Berkeley, 2002, 4 pages.*
NCSA,"Instructions for using HyperNews 1.10", Copyright Feb. 22, 2002, downloaded from WayBack Machine <http://web.archive.org/web/20020220055541/www.hypernews.org/HyperNews/get/hypernews/instructions.html>, 5 pages.*

* cited by examiner

*Primary Examiner*—Doug Hutton
*Assistant Examiner*—James H Blackwell

(57) ABSTRACT

Embodiments provide a system, method, apparatus, means, and computer program code that allow multiple annotations to a document to be created and that distinguish between the annotations made by different people. The people may view documents, exchange ideas and messages, etc. via a server or conference/collaboration system at different times and/or without being in direct communication with each other. In such an off-line collaboration mode, the people may want to add listen to, view, or add annotations regarding one or more documents. The methods and systems described herein allow users to follow the trail of annotations regarding a document and to distinguish between the voice or other audible annotations created by other people.

12 Claims, 12 Drawing Sheets

PRELIMINARY BUDGET

| | |
|---|---|
| Computer Networking Equipment | $500,000 |
| Computer Networking Support | $200,000 |
| Help Desk Support | $150,000 |
| Heating/Cooling | $300,000 |
| Leases | $120,000 |
| Office Equipment | $400,000 |

FIG. 8

PRELIMINARY BUDGET

Computer Networking Equipment $500,000
Computer Networking Support $200,000
Help Desk Support $150,000
Heating/Cooling $300,000
Leases $120,000
Office Equipment $400,000

FIG. 10

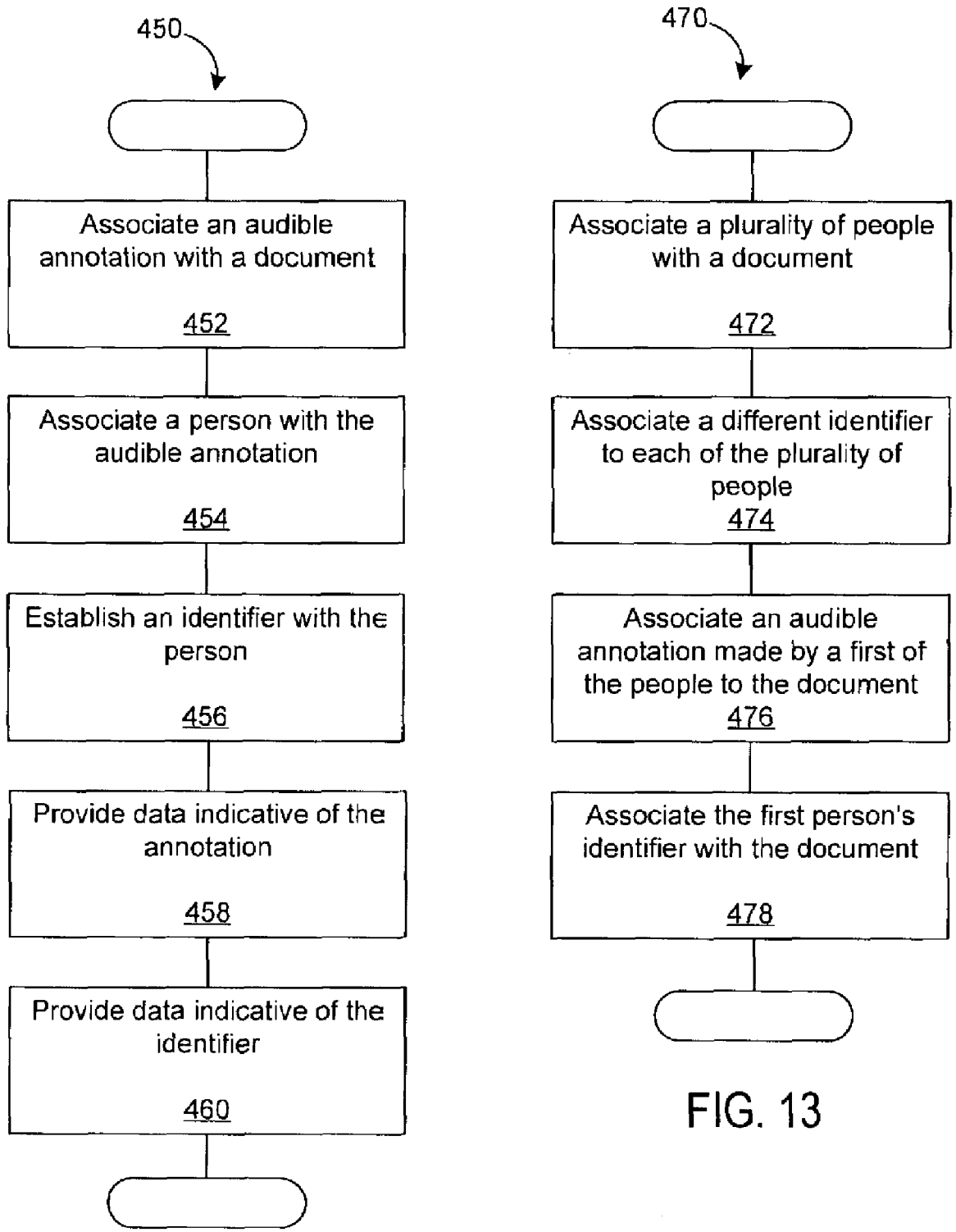

SYSTEM AND METHOD FOR INDICATING AN ANNOTATION FOR A DOCUMENT

FIELD OF THE INVENTION

The present invention relates to telecommunications systems and, in particular, to an improved system and method for indicating an annotation for a document.

BACKGROUND

The development of various voice over IP protocols such as the H.323 Recommendation and the Session Initiation Protocol (SIP) has led to increased interest in multimedia conferencing. In such conferencing, typically, a more or less central server or other device manages the conference and maintains the various communications paths to computers or other client devices being used by parties to participate in the conference. Parties to the conference may be able to communicate via voice and/or video through the server and their client devices.

Instant messaging can provide an added dimension to multimedia conferences. In addition to allowing text chatting, instant messaging systems such as the Microsoft Windows Messenger™ system can allow for transfer of files, document sharing and collaboration, collaborative whiteboarding, and even voice and video. A complete multimedia conference can involve multiple voice and video streams, the transfer of many files, and much marking-up of documents and white boarding.

Participants in the multimedia conference or collaboration effort as well as other users may want to provide a voice, text, graphical, or other type of annotation regarding a document used in the conference or collaboration, their thoughts regarding the conference or collaboration effort, etc. The annotation may be provided back to other participants in the conference or collaboration effort for further review. As such, there is a need for a system and method for allowing multiple annotations to co-exist while distinguishing between the annotations made by different participants or other users.

SUMMARY

Embodiments provide a system, method, apparatus, means, and computer program code for allowing multiple annotations for documents used in a conference or collaboration session to co-exist and for distinguishing between the annotations made by different participants in the conference or collaboration and/or other users. As part of a collaborative effort, people may view documents, exchange ideas and messages, etc. via a server or conference/collaboration system at different times and/or without being in direct communication with each other. In such an off-line collaboration mode, the people may want to add listen to, view, or add annotations regarding one or more documents. The systems, methods, apparatus, means, and computer program code described herein allow users to follow the trail of annotations regarding a document and to distinguish between the voice or other audible annotations created by other people.

Additional objects, advantages, and novel features of the invention shall be set forth in part in the description that follows, and in part will become apparent to those skilled in the art upon examination of the following or may be learned by the practice of the invention.

In some embodiments, a method for associating an annotation with a document may include associating an audible annotation with a document; associating a person with the audible annotation; establishing an identifier associated with the person; providing data indicative of the annotation; and providing data indicative of the identifier. In some other embodiments, a method for associating an annotation with a document may include associating a plurality of people with a document; associating a different identifier to each of the plurality of people; associating an audible annotation made by a first of the plurality of people to the document; and associating the first of the plurality of people's respective identifier to the document. In some embodiments, either of both of the methods may include receiving a request for a document or annotation, providing a document or annotation, receiving data indicative of a document or annotation, storing or displaying a document or annotation, and/or associating distinct icons or other identifiers with one or more people associated with a document, who have access to the document, or are allowed to record or provide an annotation for a document.

Other embodiments may include means, systems, computer code, etc. for implementing some or all of the elements of the methods described herein.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

The accompanying drawings, which are incorporated in and form a part of the specification, illustrate the embodiments, and together with the descriptions serve to explain the principles of the invention.

FIG. 8 is a diagram illustrating another graphical user interface according to some embodiments;

FIG. 10 is a diagram illustrating another graphical user interface according to some embodiments;

FIG. 12 is a flowchart of a method in accordance with some embodiments;

FIG. 13 is another flowchart of a method in accordance with some embodiments.

DETAILED DESCRIPTION

Applicant has recognized that there is a market opportunity for systems, means, computer code, and methods that allow multiple annotations for a document to co-exist and that distinguishes between the annotations made by different participants in a collaborative effort regarding or involving the document.

During a conference or collaborative effort/session, different participants may be in communication with a server or conference system via client devices (e.g., computers, telephones). The server or conference system may facilitate communication between the participants, sharing or accessing of documents, etc. The conference may be part of a collaborative effort involving the participants. In some situations, one or more of the participants may communicate in an off-line collaboration mode, wherein the participants view documents, exchange ideas and messages, etc. via the server or conference system at different times and/or without being in direct communication with each other. In such an off-line collaboration mode, the participants or other users may want to add listen to, view, or add voice or other audible annotations regarding the conference or collaborative effort. For example, a participant may want to record or otherwise add an annotation to a document being shared or prepared as part of the collaborative effort. As another example, a participant may want to listen to one or more voice annotations regarding the document previously made by other participants. The methods and systems described herein allow, for example, users to follow the trail of voice annotations regarding a document and to distinguish between the voice annotations created by other participants in an off-line collaboration session.

Figure 1:
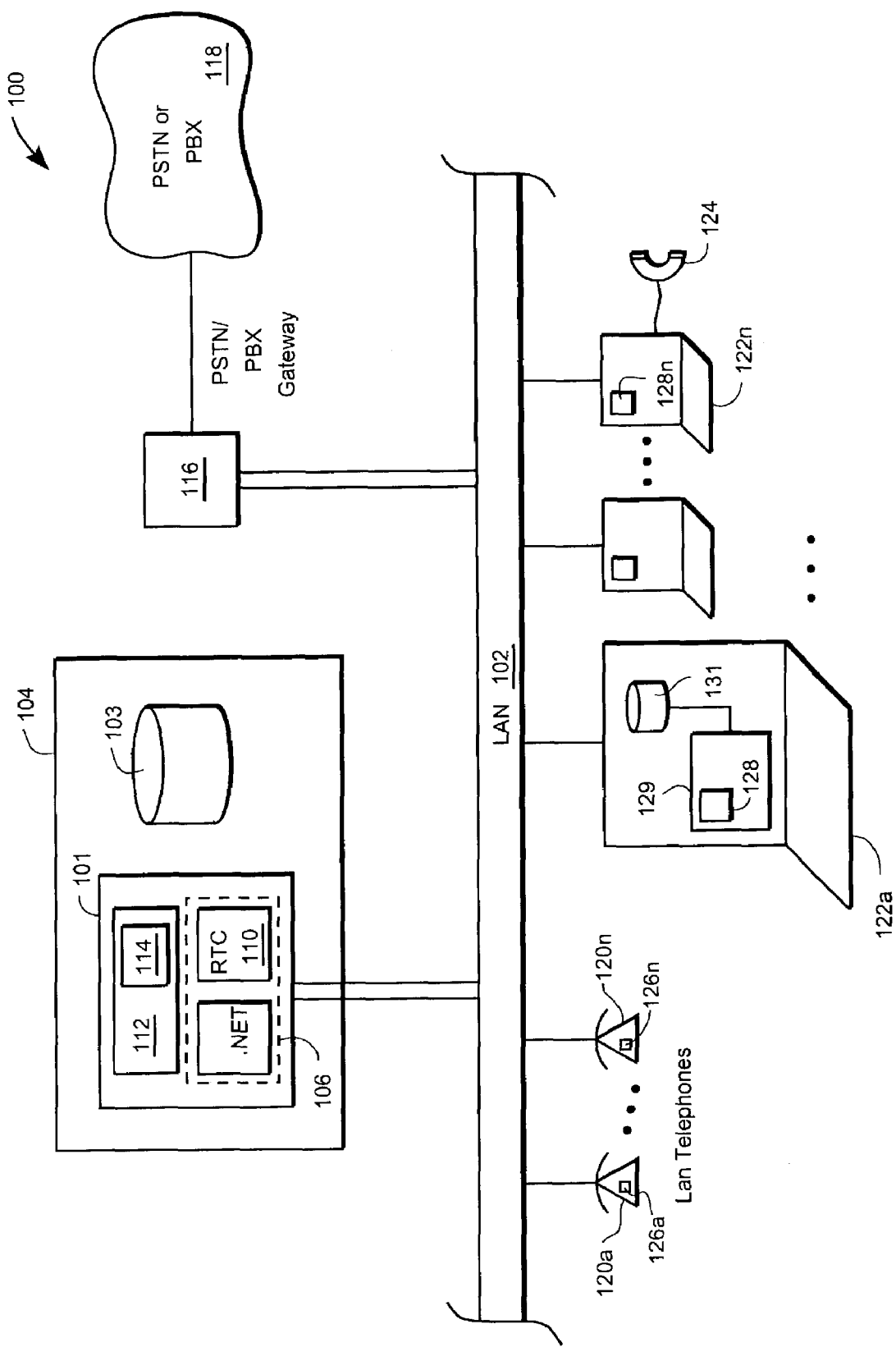
FIG. 1 is a diagram of a conference system according to some embodiments.

Referring now to FIG. 1, a diagram of an exemplary telecommunications or conference system 100 used in some embodiments is shown. As shown, the system 100 may include a local area network (LAN) 102. The LAN 102 may be implemented using a TCP/IP network and may implement voice or multimedia over IP using, for example, the Session Initiation Protocol (SIP). Operably coupled to the local area network 102 is a server 104. The server 104 may include one or more controllers 101, which may be embodied as one or more microprocessors, and memory 103 for storing application programs and data. The controller 101 may implement an instant messaging system 106. The instant messaging system may be embodied as Microsoft Windows Messenger™ software or other instant messaging system. Thus, in some embodiments, the instant messaging system 106 implements the Microsoft.Net™ environment 108 and Real Time Communications protocol (RTC) 110.

In addition, in some embodiments, a collaboration system 114 may be provided, which may be part of an interactive suite of applications 112, run by controller 101, as will be described in greater detail below. In addition, an action prompt module 115 may be provided, which detects occurrences of action cues and causes action prompt windows to be launched at the client devices 122. The collaboration system 114 may allow users of the system to become participants in a conference or collaboration session.

Also coupled to the LAN 102 is a gateway 116 which may be implemented as a gateway to a private branch exchange (PBX), the public switched telephone network (PSTN) 118, or any of a variety of other networks, such as a wireless or cellular network. In addition, one or more LAN telephones 120a-120n and one or more computers 122a-122n may be operably coupled to the LAN 102. In some embodiments, one or more other types of networks may be used for communication between the server 104, computers 122a-122n, telephones 120a-120n, the gateway 116, etc. For example, in some embodiments, a communications network might be or include the Internet, the World Wide Web, or some other public or private computer, cable, telephone, client/server, peer-to-peer, or communications network or intranet. In some embodiments, a communications network also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL connections, etc. Moreover, as used herein, communications include those enabled by wired or wireless technology. Also, in some embodiments, one or more client devices (e.g., the computers 122a-122n) may be connected directly to the server 104.

The computers 122a-122n may be personal computers implementing the Windows XP™ operating system and thus, Windows Messenger™ instant messenger system. In addition, the computers 122a-122n may include telephony and other multimedia messaging capability using, for example, peripheral cameras, Web cams, microphones and speakers (not shown) or peripheral telephony handsets 124, such as the Optipoint™ handset, available from Siemens Corporation. In other embodiments, one or more of the computers may be implemented as wireless telephones, digital telephones, or personal digital assistants (PDAs). Thus, the figures are exemplary only. As shown with reference to computer 122a, the computers may include one or more controllers 129, such as Pentium™ type microprocessors, and storage 131 for applications and other programs.

Finally, the computers 122a-122n may implement interaction services 128a-128n according to some embodiments. The interaction services 128a-128n may allow for interworking of phone, buddy list, instant messaging, presence, collaboration, calendar and other applications. In addition, the interaction services 128 may allow access to the collaboration system or module 114 and the action prompt module 115 of the server 104.

Figure 2:
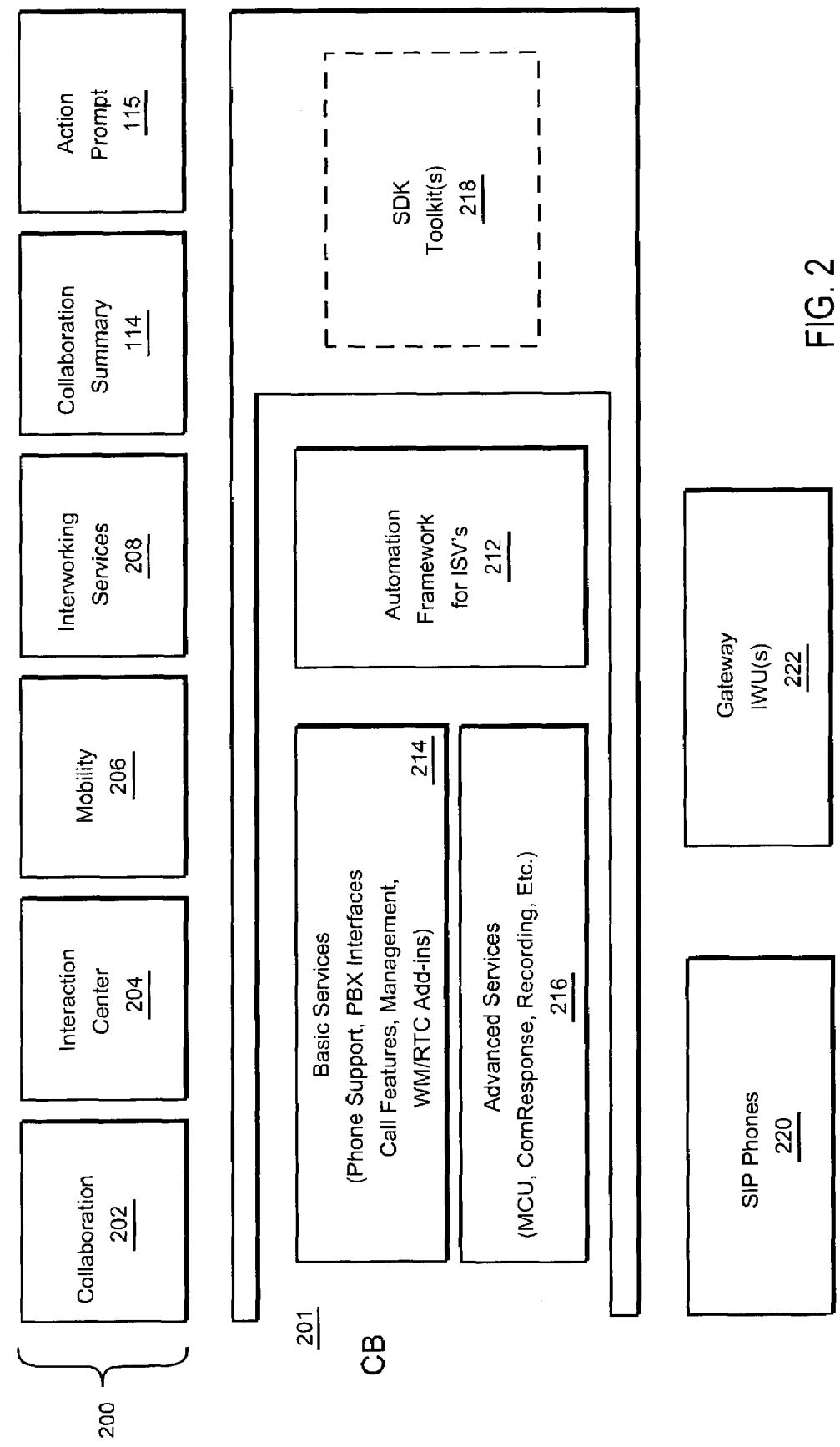
FIG. 2 is a diagram illustrating a conference collaboration system according to some embodiments.

Turning now to FIG. 2, a functional model diagram illustrating the collaboration system 114 is shown. More particularly, FIG. 2 is a logical diagram illustrating a particular embodiment of a collaboration server 104. The server 104 includes a plurality of application modules 200 and a communication broker (CB) module 201. One or more of the application modules and communication broker module 201 may include an inference engine, i.e., a rules or heuristics based artificial intelligence engine for implementing functions in some embodiments. In addition, the server 104 provides interfaces, such as APIs (application programming interfaces) to SIP phones 220 and gateways/interworking units 222.

According to the embodiment illustrated, the broker module 201 includes a basic services module 214, an advanced services module 216, an automation module 212, and a toolkit module 218. The automation module 212 implements an automation framework for ISVs (independent software vendors) 212 that allow products, software, etc. provided by such ISVs to be used with or created the server 104.

The basic services module 214 functions to implement, for example, phone support, PBX interfaces, call features and management, as well as Windows Messaging™ software and RTC add-ins, when necessary. The phone support features allow maintenance of and access to buddy lists and provide presence status.

The advanced services module 216 implements function such as presence, multipoint control unit or multi-channel conferencing unit (MCU), recording, and the like. MCU functions are used for voice conferencing and support ad hoc and dynamic conference creation from a buddy list following the SIP conferencing model for ad hoc conferences and collaboration sessions. In certain embodiments, support for G.711 and G.723.1 codecs is provided. Further, in some embodiments, the MCU can distribute media processing over multiple servers using the MEGACO protocol. In some embodiments, an MCU may provide the ability for participants to set up ad hoc voice, data, or multimedia conferencing or collaboration sessions. During such sessions, different client devices (e.g., the computers 122a-122n) may establish channels to the MCU and the server 104, the channels carrying voice, audio, video and/or other data from and to participants via their associated client devices. In some cases, more than one participant may be participating in the conference via the same client device. For example, multiple participants may be using a telephone (e.g., the telephone 126a) located in a conference room to participate in the conference. Also, in some cases, a participant may be using one client device (e.g., a computer) or multiple devices (e.g., a computer and a telephone) to participate in the conference. The Real-Time Transport Protocol (RTP) and the Real Time Control Protocol (RTCP) may be used to facilitate or manage communications or data exchanges between the client devices for the participants in the conference.

In some embodiments an MCU may include a mixer application or logical function that provides the audio, video, voice, etc. data to the different participants. The MCU may handle or manage establishing the calls in and out to the different participants and establish different channels with the client devices used by the participants. The server 104 may include, have access to, or be in communication with additional applications or functions that establish a list of participants in the conference as well as identify the participants speaking at a given moment during the conference.

Presence features provide device context for both SIP registered devices and user-defined non-SIP devices. Various user contexts, such as In Meeting, On Vacation, In the Office, etc., can be provided for. In addition, voice, e-mail, and instant messaging availability may be provided across the user's devices. The presence feature enables real time call control using presence information, e.g., to choose a destination based on the presence of a user's device(s). In addition, various components have a central repository for presence information and for changing and querying presence information. In addition, the presence module provides a user interface for presenting the user with presence information.

In addition, the broker module 201 may include the ComResponse™ platform, available from Siemens Information and Communication Networks, Inc. The ComResponse™ platform features include speech recognition, speech-to-text, and text-to-speech, and allows for creation of scripts for applications. The speech recognition and speech-to-text features may be used by the collaboration summarization unit 114 and the action prompt module 115.

In addition, real time call control is provided by a SIP API 220 associated with the basic services module 214. That is, calls can be intercepted in progress and real time actions performed on them, including directing those calls to alternate destinations based on rules and or other stimuli. The SIP API 220 also provides call progress monitoring capabilities and for reporting status of such calls to interested applications. The SIP API 220 also provides for call control from the user interface.

The toolkit module 218 may provide tools, APIs, scripting language, interfaces, software modules, libraries, software drivers, objects, etc. that may be used by software developers or programmers to build or integrate additional or complementary applications.

According to the embodiment illustrated, the application modules include a collaboration module 202, an interaction center module 204, a mobility module 206, an interworking services module 208, a collaboration summarization module 114, and an action prompt module 115.

The collaboration module 202 allows for creation, modification or deletion of a collaboration session for a group of participants or other users. The collaboration module 202 may further allow for invoking a voice conference from any client device. In addition, the collaboration module 202 can launch a multi-media conferencing package, such as the WebEx™ package. It is noted that the multi-media conferencing can be handled by other products, applications, devices, etc.

The interaction center 204 provides a telephony interface for both subscribers and guests. Subscriber access functions include calendar access and voicemail and e-mail access. The calendar access allows the subscriber to accept, decline, or modify appointments, as well as block out particular times. The voicemail and e-mail access allows the subscriber to access and sort messages.

Similarly, the guest access feature allows the guest access to voicemail for leaving messages and calendar functions for scheduling, canceling, and modifying appointments with subscribers. Further, the guest access feature allows a guest user to access specific data meant for them, e.g., receiving e-mail and fax back, etc.

The mobility module 206 provides for message forwarding and "one number" access across media, and message "morphing" across media for the subscriber. Further, various applications can send notification messages to a variety of destinations, such as e-mails, instant messages, pagers, and the like. In addition, a user can set rules that the mobility module 206 uses to define media handling, such as e-mail, voice and instant messaging handling. Such rules specify data and associated actions. For example, a rule could be defined to say "If I'm traveling, and I get a voicemail or e-mail marked Urgent, then page me."

Further, the collaboration summarization module 114 is used to identify or highlight portions of a multimedia conference and configure the portions sequentially for later playback. The portions may be stored or identified based on recording cues either preset or settable by one or more of the participants in the conference, such as a moderator. The recording cues may be based on vocalized keywords identified by the voice recognition unit of the ComResponse™ module, or may be invoked by special controls or video or whiteboarding or other identifiers.

The action prompt module 115 similarly allows a user to set action cues, which cause the launch of an action prompt window at the user's associated client device 122. In response, the client devices 122 can then perform various functions in accordance with the action cues.

Figure 3:
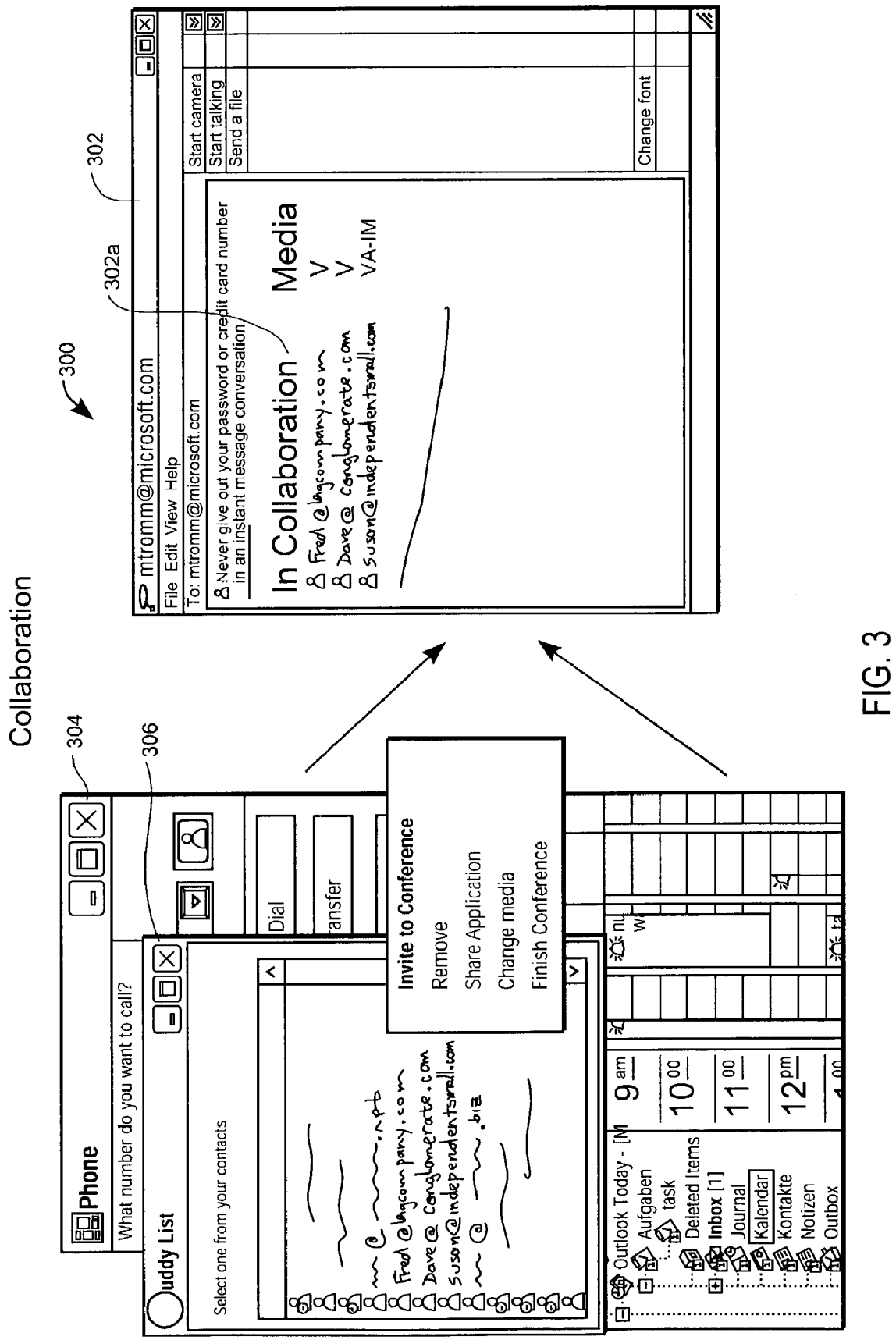
FIG. 3 is another diagram illustrating a conference collaboration system according to some embodiments.

Now referring to FIG. 3, a diagram of a graphical user interface 300 used in some embodiments is shown. In particular, shown are a variety of windows for invoking various functions. Such a graphical user interface 300 may be implemented on one or more of the client devices 302, 304, 306, 308. Thus, the graphical user interface 300 may interact with the interactive services unit 128 to control collaboration sessions.

Shown are a collaboration interface 302, a phone interface 304, and a buddy list 306. It is noted that other functional interfaces may be provided. According to particular embodiments, certain of the interfaces may be based on, be similar to, or interwork with, those provided by Microsoft Windows Messenger™ or Outlook™ software.

The buddy list 306 is used to set up instant messaging calls and/or multimedia conferences. The phone interface 304 is used to make calls, e.g., by typing in a phone number, and also allows invocation of supplementary service functions such as transfer, forward, etc. The collaboration interface 302 allows for viewing the parties to a conference or collaboration 302a and the type of media involved. It is noted that, while illustrated in the context of personal computers 122, similar interfaces may be provided the telephones or cellular telephones or PDAs. During a conference or collaboration, participants in the conference or collaboration may access or view shared documents or presentations, communicate with each other via audio, voice, data and/or video channels, etc.

Figure 4:
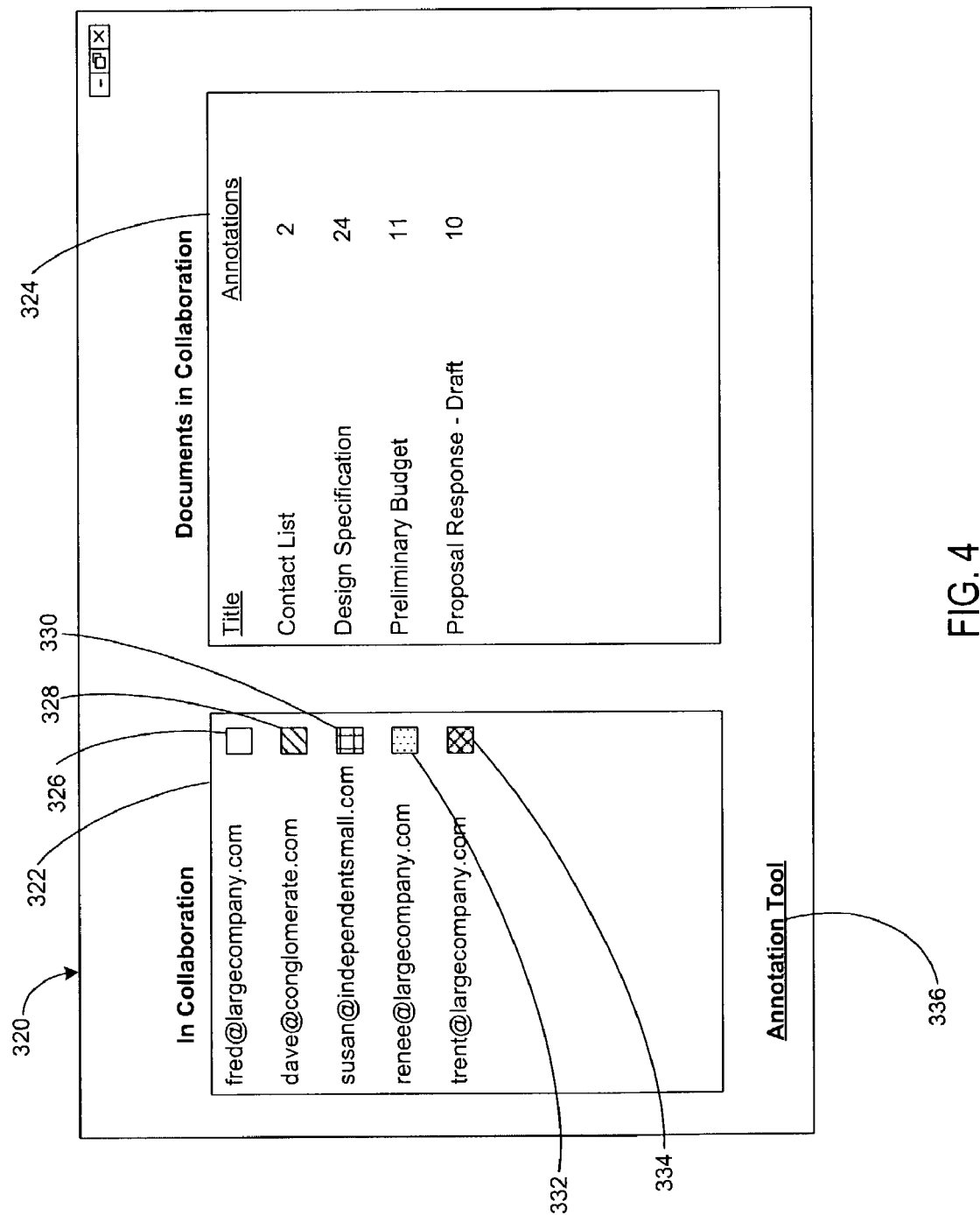
FIG. 4 is a diagram illustrating a graphical user interface according to some embodiments.

Now referring to FIG. 4, a representative window 320 is illustrated that may allow a user to access documents associated with a collaboration effort or group and to access annotations associated with documents that are themselves associated with the collaboration effort or group. For example, the window 320 includes two primary portions 322 and 324 that provide information regarding the five participants in the collaboration and documents associated with the collaboration. The window 320 may be displayed on a client device used by a person associated with a collaboration. The window portion 322 is similar to the window 302a described previously above. In addition to listing participants by their email address that are associated with the collaboration, the window 322 also includes icons or other identifiers 326, 328, 330, 332, 334, each being associated with a different participant. Each of the icons 326, 328, 330, 332, 334 may be different (e.g., visually distinct or having a different color, shape, fill pattern, flashing rate, size, etc.) to indicate its relationship with a particular participant, as will be discussed in more detail below. Thus, the icons act as identifiers for specific people with regard to annotations made by the people to one or more documents.

The window portion 324 includes information regarding documents that are being used by the five participants and the number of annotations already made to each of the documents. For example, the window portion 324 indicates that the document entitled "Contact List" has two associated annotations and that the document entitled "Preliminary Budget" has eleven associated annotations. In some embodiments, a user of the window 320 may be able to access or open a document by selecting it or clicking on it in the window 320. Similarly, in some embodiments, the user of the window 320 may be able to access or open one or more annotations associated with a document by selecting or clicking on an annotation number associated with the document. Alternatively, clicking on a document name or annotation number, or clicking on a link or button 336 entitled "Annotation Tool" might result in display of an annotation tool window 340, as illustrated in FIG. 5.

Figure 5:
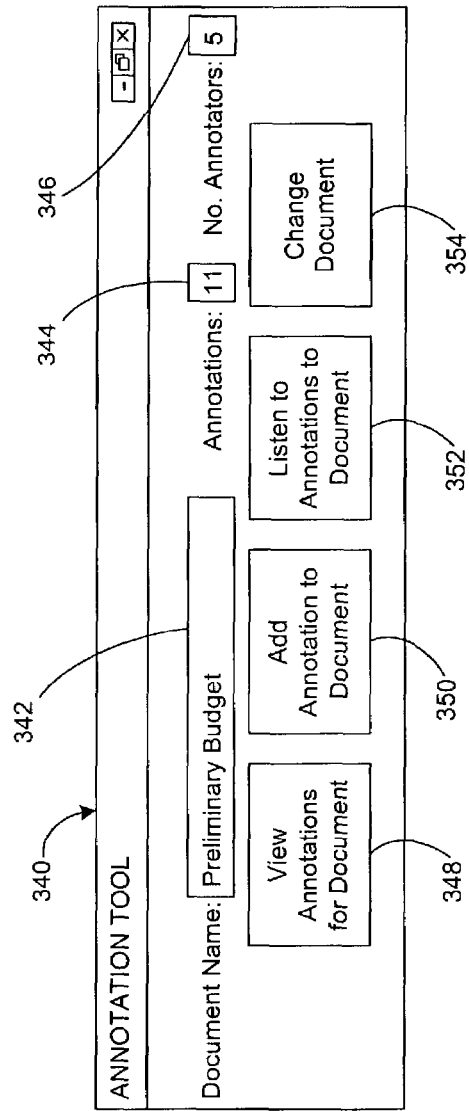
FIG. 5 is a diagram illustrating another graphical user interface according to some embodiments.

Now referring to FIG. 5, the annotation tool window 340 may allow a user to access or create annotations associated with a document. The window 340 may be displayed on a client device used by a person associated with a collaborative effort. The window 340 may include a text block 342 in which the user may type the name of the document (e.g., "Preliminary Budget") of interest. Alternatively, clicking on or selecting the document on the window 320 may cause the document to be displayed automatically in the text block 342. Once the document name is known, the window 340 may display the number of annotations associated with the document in text block 344 and the number of different annotators for the document in text block 346.

In some embodiments, the window 340 also may include one or more buttons 348, 350, 352, 354 that allow a user to initiate different functions or features. For example, selecting or clicking on the button 348 may allow the user to view information regarding annotations made to the document "Preliminary Budget". Selecting or clicking on the button 350 may allow the user to record or add an annotation that is associated with the document "Preliminary Budget".

Selecting or clicking on the button 352 may allow a user to listen to previously recorded annotations associated with the document. For example, selecting the button 352 may cause all of the previously recorded annotations for the document to be played in chronological order, in chronological order by individual, or in accordance with some other rule or procedure.

Selecting or clicking on the button 354 may cause the text blocks 342, 344, 346 to be emptied and a prompt to be displayed the user to enter a new document name in the text box 342.

Figure 6:
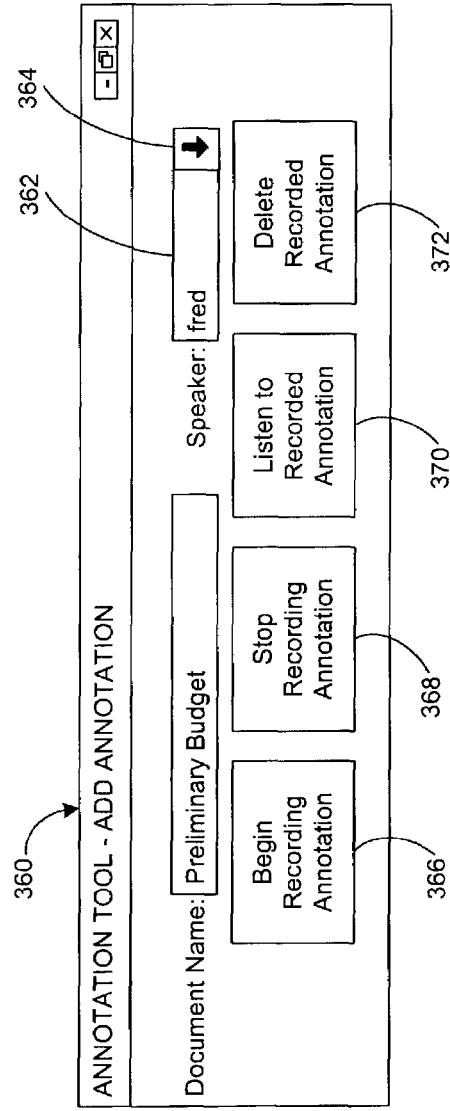
FIG. 6 is a diagram illustrating another graphical user interface according to some embodiments.

When a user clicks on or selects the button 350, the window 360 may be displayed that will allow the user to record an annotation for the document "Preliminary Budget", as illustrated in FIG. 6. The window 360 may be displayed on a client device (e.g., the computer 122a) used by a person associated with a collaboration. The window 360 may include a text block 362 in which the user can indicate who is making the annotation. The text block 362 may include a pull down menu that the user can access via box 364. When used, the pull down menu may have a list of all people having the ability to add such an annotation, which may include the people indicated in the window 322. By selecting or clicking button 366, the user can begin recording the annotation. The window 360 may be associated with a particular microphone or other input device on a client device (e.g., computer, telephone) displaying the window 360 that the user can use to provide the audible annotation. The user can stop the recording by selecting or clicking button 368. Selecting or clicking button 370 will cause the just recorded annotation to be replayed while selecting or clicking button 372 will cause the just recorded annotation to be canceled or deleted.

In some embodiments, an annotation for a document may be stored as a .WAV file and is associated with the document or stored as part of the document file. In some embodiments, the annotations for a document may be stored as separate files from the document. Each annotation may be stored or kept as a separate file, thereby allowing the annotations to be accessed and listened to separately and independently. An annotation file also may include information (e.g., icon, icon color, speaker name or other identifier, creation date/time, document identifier, client device identifier, etc.) that associates the annotation with a specific speaker, document, client device, etc. Playing of an annotation may involve retrieval of the appropriate annotation file and delivery of the annotation file to a client device, which can then play the annotation using software operating on the client device. Annotation files may be stored in the same locations as their associated documents, which may be managed or provided by the server 104, an application or module forming part of the server 104, or some other application, device, etc.

Figure 7:
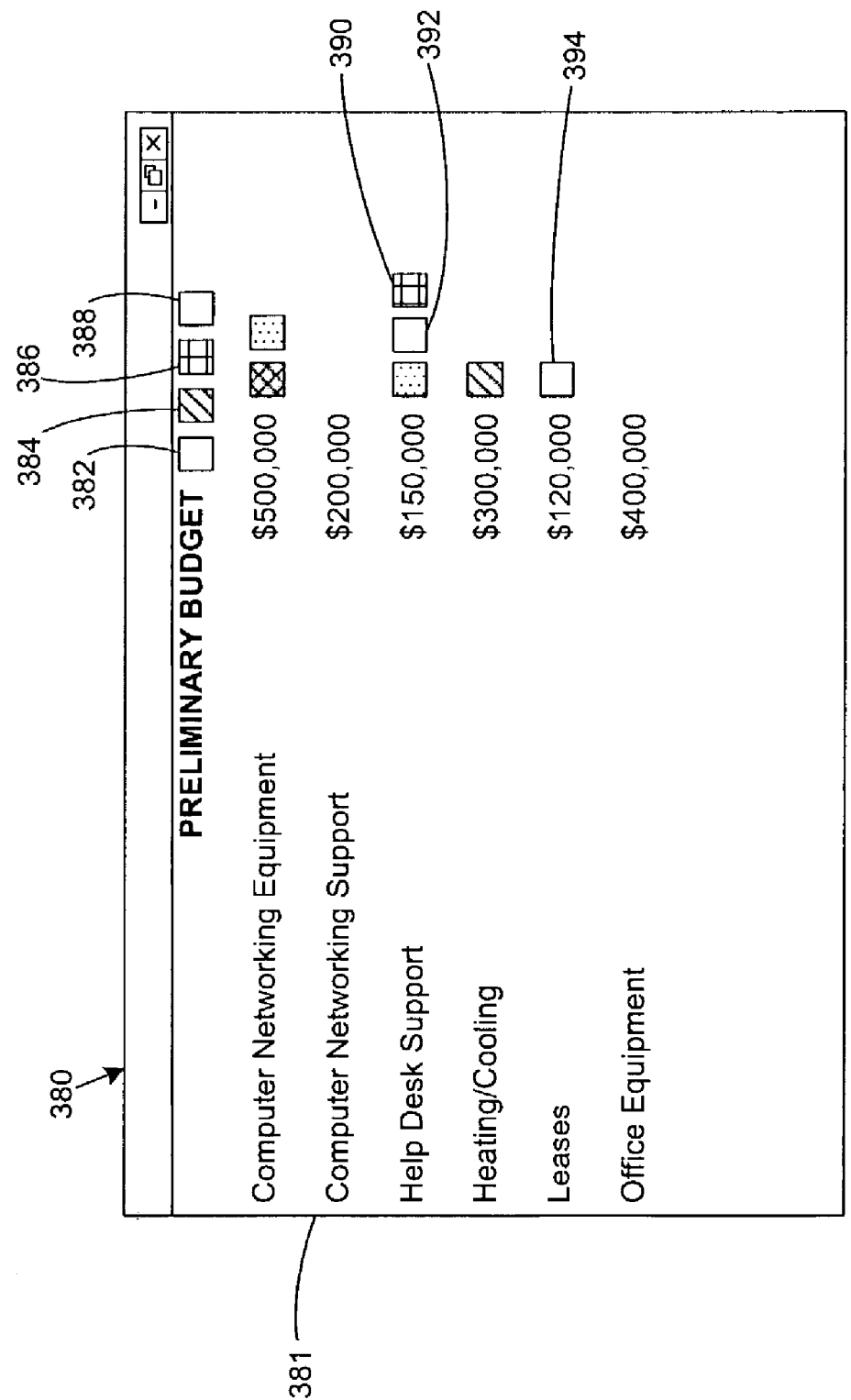
FIG. 7 is a diagram illustrating another graphical user interface according to some embodiments.

Now referring to FIG. 7, a window 380 is illustrated that may allow a user to access annotations associated with a document 381 (e.g., the document entitled "Preliminary Budget"). For example, the document 381 and the window 380 may be displayed by a client device associated with the user if the user clicks on the document entitled "Preliminary Budget" in the window 320 or on the button 348 in the window 340.

In some embodiments, the document 381 may be displayed in or by a conventional word processor, spreadsheet, document manager, or other software application. The displayed document 381 may include icons that indicate annotations to the document 381, such as the icons 382, 384, 386, 388, 390, 392, 394. The different colors, shapes, fill patterns, flashing rates, sizes, etc. of the icons displayed in or with the document 381 may indicate the providers of the annotations associated with the icons. For example, as illustrated in the window 320 of FIG. 4, the annotation icons 382, 388, 392, 394 are associated with the user identified by email address "fred@largecompany.com". Thus, this user has recorded four annotations that are associated with the document "Preliminary Budget" in the window 380. The relative positions of the icons 382, 388, 392, 394 in the window 380 or the document 381 may indicate the general or specific subject matter of the annotations. Similarly, the annotation icon 384 is associated with the user identified by email address "dave@conglomerate.com" and the annotation icons 386, 390 are associated with the user identified by email address "susan@independentsmall.com". Clicking or selecting any of the icons displayed in the window 380 may cause the corresponding voice annotation to be played, delivered to a specific client device, etc. The annotation icons in the window 380 also may have associated with them information regarding the dates/times of the creation of their associated annotations. As a result, moving a curser over an icon in the drop down window 380 may allow display in the window 380 of the creation date/time of the annotation associated with the icon.

Now referring to FIG. 8, a window 400 is illustrated that may allow a user to access annotations associated with a document 401 (e.g., the document entitled "Preliminary Budget"). For example, the document 401 and the window 400 may be displayed by a client device associated with the user if the user clicks on the document entitled "Preliminary Budget" in the window 320 or on the button 348 in the window 340.

Figure 9:
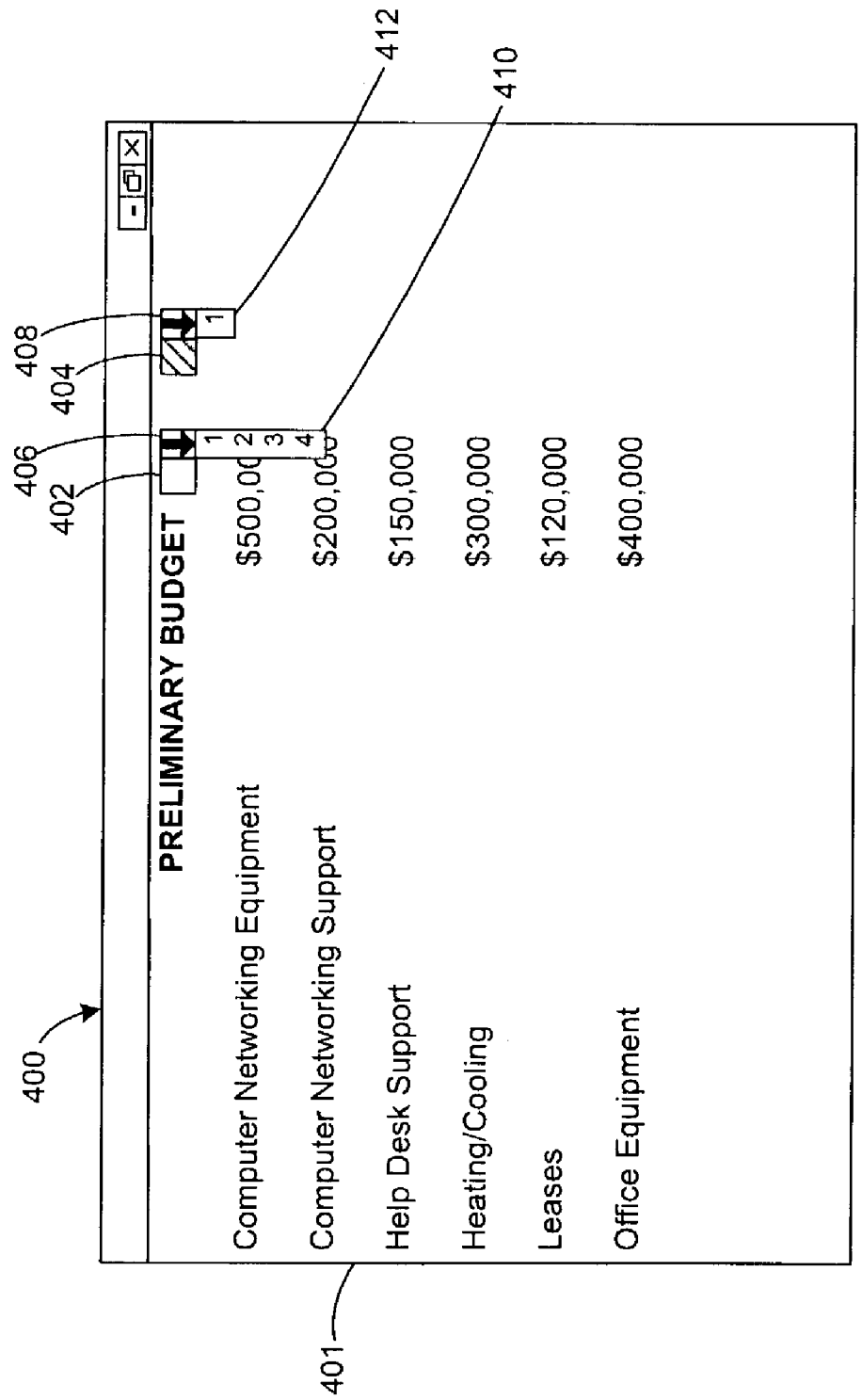
FIG. 9 is a diagram illustrating another graphical user interface according to some embodiments.

In some embodiments, the document 401 may be displayed in or by a conventional word processor, spreadsheet, document manager, or other software application. The displayed document 401 may include icons that indicate annotations to the document exist, such as the icons 402 and 404. The different colors, shapes, fill patterns, flashing rates, sizes, etc. of the icons 402 and 404 displayed in or with the document 381 may indicate the providers of the annotations associated with the icons. For example, as illustrated in the window 400 of FIG. 8, the annotation icon 402 is associated with the user identified by email address "fred@largecompany.com". Similarly, the annotation icon 404 is associated with the user identified by email address "dave@conglomerate.com". Thus, the icons 402 and 404 indicate that specific users have provided annotations to the document 401. Arrows 406, 408 indicate that the user may view specific annotations for the respective annotators identified by "fred@largecompany.com" and "dave@conglomerate.com". For example, now referring to FIG. 9, a user of the window 400 selecting or clicking on the arrow 406 may cause drop down menu 410 to appear and selecting or clicking on arrow 408 may cause drop menu 412 to appear. The drop down menu 410 indicates that the annotator identified by "fred@largecompany.com" has made or recorded four annotations associated with the document 401 and the drop down menu 412 indicates that the annotator identified by "dave@conglomerate.com" has made one annotation associated with the document 401. The user may listen to any of the four annotations indicated in the drop down menu 410 my selecting or clicking on the iteration numbers "1", "2", "3" or "4" in the drop down menu 410. Similarly, the user may listen to the annotation indicated in the drop down menu 412 by selecting or clicking on the iteration number "1" in the drop down menu 412. Clicking on or selecting any of the iteration numbers in the drop down menus 410 or 412 may cause the annotation associated with the iteration number to be played, delivered to a specific client device, etc.

Each time an annotation is created and associated with the document 401, the appropriate iteration number may added to the appropriate drop down menu or a drop down menu may be added as needed. Iteration numbers for annotations also may have associated with them information regarding the dates/times of the creation of the annotations. As a result, moving a curser over an iteration number may allow display in the window 400 of the creation date/time of the annotation associated with the iteration number.

Now referring to FIG. 10, a window 420 is illustrated that may allow a user to access annotations associated with a document 421 (e.g., the document entitled "Preliminary Budget"). For example, the document 421 and the window 420 may be displayed by a client device associated with the user if the user clicks on the document entitled "Preliminary Budget" in the window 320 or on the button 348 in the window 340.

Figure 11:
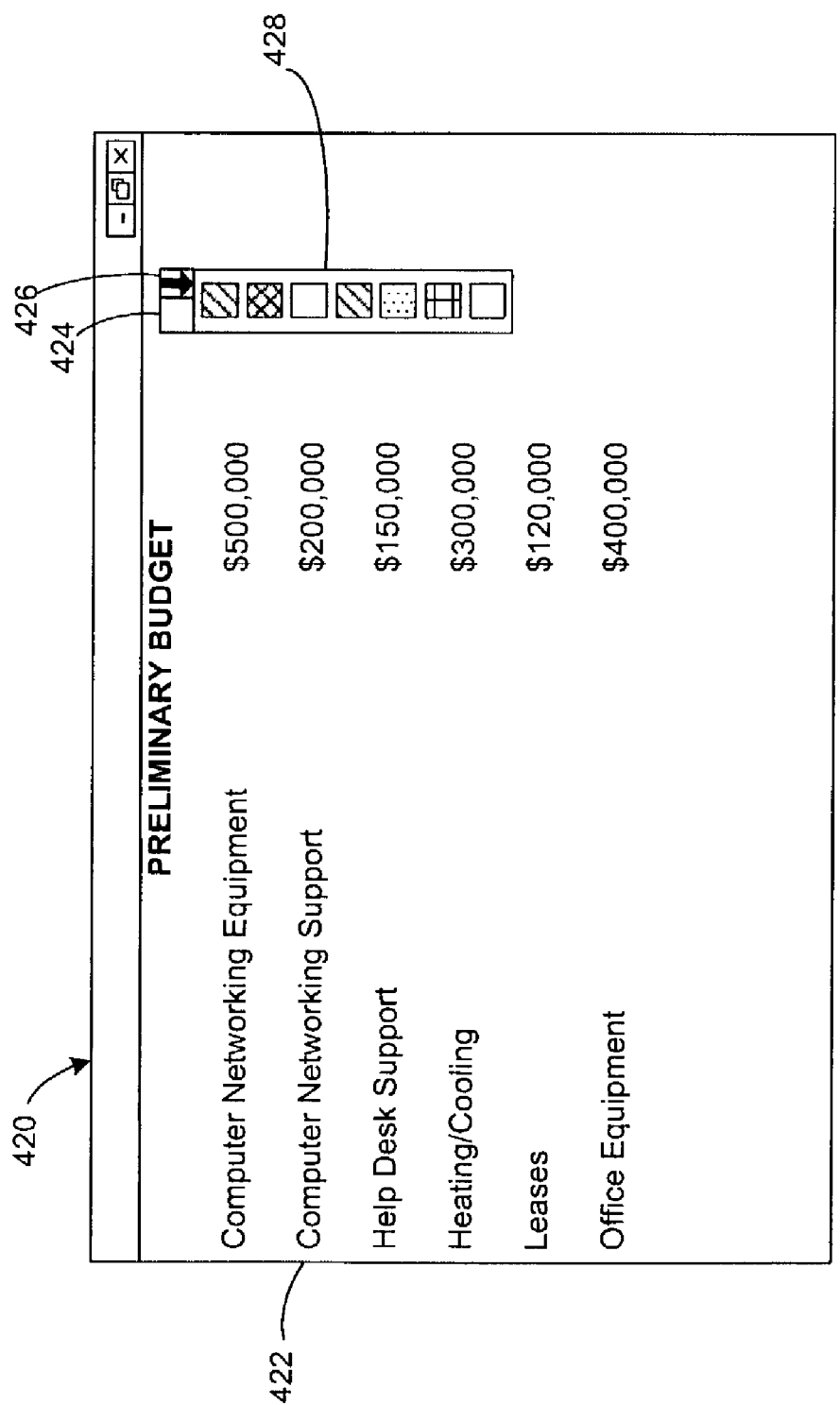
FIG. 11 is a diagram illustrating another graphical user interface according to some embodiments.

In some embodiments, the document 421 may be displayed in or by a conventional word processor, spreadsheet, document manager, or other software application. The displayed document 421 may include icons that indicate annotations to the document exist, such as the icons 424 and 426. The icon 424 is not associated with any particular annotator and may indicate only that annotations to the document 421 exist. Selecting or clicking on the icon 426 may cause a drop down menu 428 to be displayed, as indicated in FIG. 11.

The drop down menu 428 may include a number of icons, each associated with a particular speaker. The relative positions, colors, fill patterns, etc. of the icons in the drop down menu 428 may indicate the order in which annotations where added and by which annotator. Clicking on or selecting any of the icons in the drop down menu 428 may cause the annotation associated with the icon to be played, delivered to a specific client device, etc. The icons in the drop down menu 428 also may have associated with them information regarding the dates/times of the creation of the annotations. As a result, moving a curser over an icon in the drop down menu 429 may allow display in the window 420 of the creation date/time of the annotation associated with the icon.

Process Description

Reference is now made to FIG. 12, where a flow chart 450 is shown which represents the operation of a first embodiment a method. The particular arrangement of elements in the flow chart 450 is not meant to imply a fixed order to the elements; embodiments can be practiced in any order that is practicable. In some embodiments, some or all of the elements of the method 450 may be performed or completed by the server 104 or another device or application, as will be discussed in more detail below.

Processing begins at 452 during which the server 104 associates an audible annotation with a document. The document may be accessible to or otherwise associated with multiple people as part of a collaboration effort, conference, etc.

In some embodiments, the server 104 may receive the annotation from a client device (e.g., the computer 122*a*) as an annotation file recorded by the client device via use of an annotation tool (e.g., the annotation tool windows 340 and 360). In other embodiments, the server 104 may record the annotation directly or receive data indicative of the annotation from another source. The server 104 may store the annotation with, as part of, separate from, or in the same location as the document.

During 454, the server 104 associates a person with the audible annotation. In some embodiments, the person may be the person who recorded the annotation, the person associated with the client device from which the server 104 received the annotation, a person chosen from a list of people associated with the document or who have the right or ability to create an annotation for the document, or a person chosen via some other means. For example, in some embodiments the server 104 may have or have access to voice or speaker recognition applications or other technology through which the server 104 can identify the speaker of a voice annotation. In some embodiments, 454 may include requesting, establishing, or otherwise determining the identify of the person.

During 456, the server 104 establishes an identifier for the person. The identifier may be a specific icon, icon color, name, code, etc. In some embodiments, a document may be associated with multiple people (e.g., all of the people who have access to a particular document). Each of the people may be assigned a different or distinct identifier during an implementation of 456. In such embodiments, 456 may occur prior to 452 and/or 454.

During 458, the server 104 provides data indicative of the annotation. For example, the server 104 may provide the annotation upon receiving a request for the annotation or the document. As another example, the server 104 may provide or display an icon or other identifier in conjunction with the document to indicate that the annotation exists or is otherwise available. The icon or other identifier may be displayed in, on, or as part of the document itself, as part of a window or toolbar used with the document, or in some other fashion.

During 460, the server 104 provides data indicative of the identifier established during 456. For example, the server 104 may provide the identifier upon receiving a request for the annotation or the document. As another example, the server 104 may provide or display an icon or other identifier in conjunction with the document to indicate that the annotation exists or is otherwise available and/or to indicate that the annotation is associated with or related to the specific person. The icon or other identifier may be displayed in or as part of the document itself, as part of a window or toolbar used with the document, or in some other fashion. Data provided by the server 104 may be indicative of the icon associated with the specific person and/or the annotation.

Reference is now made to FIG. 13, where a flow chart 470 is shown which represents the operation of a second embodiment of a method. The particular arrangement of elements in the flow chart 470 is not meant to imply a fixed order to the elements; embodiments can be practiced in any order that is practicable. In some embodiments, some or all of the elements of the method 450 may be performed or completed by the server 104 or another device or application, as will be discussed in more detail below.

Processing begins at 472 during which the server 104 associates a plurality of people with a document. For example, the people may be participants in a conference or on-line or off-line collaborative effort, each having permission to access the document, make or provide annotations for the document, etc. The list of people or data indicative of the people may be received from an application, client device, or other device. As another example, the list of people may be established by a person setting up a conference, collaborative session or effort, etc.

During 474, the server 104 associates a different identifier to each of the plurality of people associated with the document. For example, the server 104 may associate different icons, icon shapes, icon colors, names, codes, etc. to each of the people. In some embodiments, 474 may be or include the server 104 receiving data indicative of the identifiers to be associated with the people from another application, device, etc.

During 476, the server 104 associates an audible annotation made by one of the plurality of people with the document. For example, in some embodiments, the server 104 may receive the annotation from a client device (e.g., the computer 122*a*) as an annotation file recorded by the client device via use of an annotation tool (e.g., the annotation tool windows 340 and 360). In other embodiments, the server 104 may record the annotation directly or receive data indicative of the annotation from another source. The server 104 may store the annotation with, as part of, separate from, or in the same location as the document.

During 478, the server 104 associates the identifier of the person who made the annotation with the document. For example, the server 104 may store the identifier with, as part of, separate from, or in the same location as the document and/or the annotation. The server 104 also may display the identifier in or with the document, as part of a window or toolbar used with the document, or in some other fashion.

In some embodiments, the server 104 may receive a request for a document and/or annotation, provide a document and one or more annotations, icons, identifiers, etc. associated with the document, etc.

Server

Figure 14:
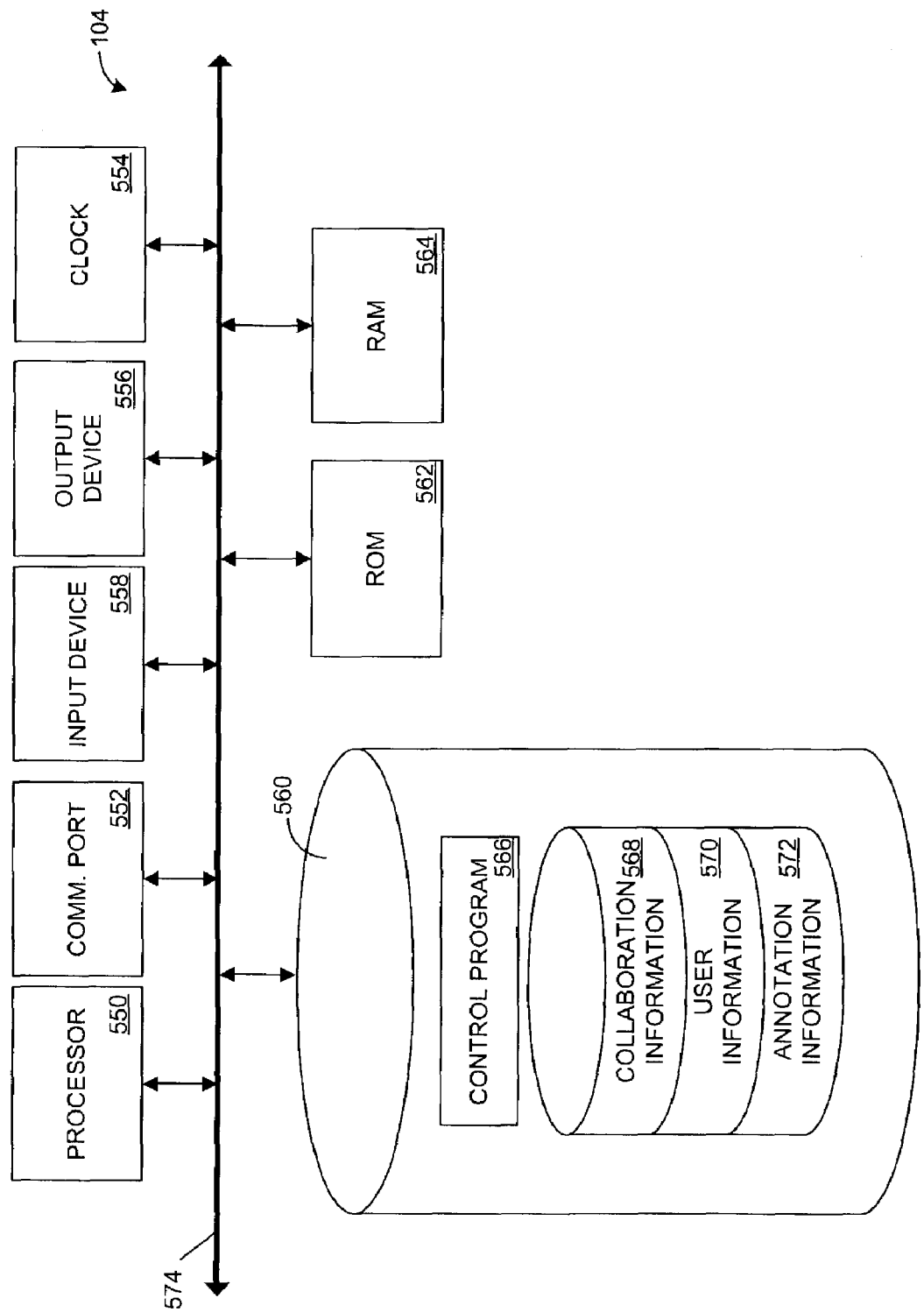
FIG. 14 is a block diagram of possible components that may be used in some embodiments of the server of FIG. 1.

Now referring to FIG. 14, a representative block diagram of a server or controller 104 is illustrated. The server 104 can comprise a single device or computer, a networked set or group of devices or computers, a workstation, mainframe or host computer, etc., and, in some embodiments, may include some or all of the components described above in regards to FIG. 1. In some embodiments, the server 104 may be adapted to implement one or more elements of the methods disclosed herein.

The server 104 may include a processor, microchip, central processing unit, or computer 550 that is in communication with or otherwise uses or includes one or more communication ports 552 for communicating with user devices and/or other devices. The processor 550 may be or include some or all of the controller 101 previously discussed above. In some embodiments, the processor 550 may be operative to implement one or more of the elements of the methods disclosed herein.

Communication ports may include such things as local area network adapters, wireless communication devices, Bluetooth technology, etc. The server 104 also may include an internal clock element 554 to maintain an accurate time and date for the server 104, create time stamps for communications received or sent by the server 104, etc.

If desired, the server 104 may include one or more output devices 556 such as a printer, infrared or other transmitter, antenna, audio speaker, display screen or monitor (e.g., the monitor 400), text to speech converter, etc., as well as one or more input devices 558 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the server 104 may include a memory or data storage device 560 (which may be or include the memory 103 previously discussed above) to store information, software, databases, documents, communications, device drivers, etc. The memory or data storage device 560 preferably comprises an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. The server 104 also may include separate ROM 562 and RAM 564.

The processor 550 and the data storage device 560 in the server 104 each may be, for example: (i) located entirely within a single computer or other computing device; or (ii) connected to each other by a remote communication medium, such as a serial port cable, telephone line or radio frequency transceiver. In one embodiment, the server 104 may comprise one or more computers that are connected to a remote server computer for maintaining databases.

A conventional personal computer or workstation with sufficient memory and processing capability may be used as the server 104. In one embodiment, the server 104 operates as or includes a Web server for an Internet environment. The server 104 may be capable of high volume transaction processing, performing a significant number of mathematical calculations in processing communications and database searches. A Pentium™ microprocessor such as the Pentium III™ or IV™ microprocessor, manufactured by Intel Corporation may be used for the processor 550. Equivalent processors are available from Motorola, Inc., AMD, or Sun Microsystems, Inc. The processor 550 also may comprise one or more microprocessors, computers, computer systems, etc.

Software may be resident and operating or operational on the server 104. The software may be stored on the data storage device 560 and may include a control program 566 for operating the server, databases, etc. The control program 566 may control the processor 550. The processor 550 preferably performs instructions of the control program 566, and thereby operates in accordance with the present invention, and particularly in accordance with the methods described in detail herein. The control program 566 may be stored in a compressed, uncompiled and/or encrypted format. The control program 566 furthermore includes program elements that may be necessary, such as an operating system, a database management system and device drivers for allowing the processor 550 to interface with peripheral devices, databases, etc. Appropriate program elements are known to those skilled in the art, and need not be described in detail herein.

The server 104 also may include or store information regarding users, user or client devices, conferences, collaborations, annotations, documents, communications, etc. For example, information regarding one or more collaborations may be stored in a conference information database 568 for use by the server 104 or another device or entity. Information regarding one or more users (e.g., participants in a collaboration effort) may be stored in a user information database 570 for use by the server 104 or another device or entity and information regarding one or more annotations may be stored in an annotation information database 572 for use by the server 104 or another device or entity. In some embodiments, some or all of one or more of the databases may be stored or mirrored remotely from the server 104.

In some embodiments, the instructions of the control program may be read into a main memory from another computer-readable medium, such as from the ROM 562 to the RAM 564. Execution of sequences of the instructions in the control program causes the processor 550 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 550, communication port 552, clock 554, output device 556, input device 558, data storage device 560, ROM 562, and RAM 564 may communicate or be connected directly or indirectly in a variety of ways. For example, the processor 550, communication port 552, clock 554, output device 556, input device 558, data storage device 560, ROM 562, and RAM 564 may be connected via a bus 574.

While specific implementations and hardware configurations for the server 104 have been illustrated, it should be noted that other implementations and hardware configurations are possible and that no specific implementation or hardware configuration is needed. Thus, not all of the components illustrated in FIG. 14 may be needed for the server 104 implementing the methods disclosed herein.

The methods described herein may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the elements for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, two or more of the elements in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present invention has been described with respect to various embodiments thereof, those skilled in the art will note that various substitutions may be made to those embodiments described herein without departing from the spirit and scope of the present invention. The invention described in the above detailed description is not intended to be limited to the specific form set forth herein, but is intended to cover such alternatives, modifications and equivalents as can reasonably be included within the spirit and scope of the appended claims.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

What is claimed is:

1. A method for associating an annotation with a document, comprising:
    associating a first plurality of audible annotations with a document;
    associating a second one or more audible annotations with the document;
    associating a first person with said first plurality of audible annotations;
    associating a second person with said second one or more audible annotations;
    presenting the document together with a first icon associated with the first plurality of audible annotations and a second icon associated with the second one or more audible annotations;
    receiving a selection of the first icon;
    presenting a plurality of indications in response to the selection of the first icon, each of the plurality of indications associated with a respective one of the first plurality of audible annotations;
    receiving a selection of one of the plurality of indications; and
    audibly presenting one of the first plurality of audible annotations associated with the selected indication.

2. The method of claim 1, wherein said associating the first plurality of audible annotations with the document includes obtaining an audible annotation made by said first person.

3. The method of claim 1, wherein associating the first person with said first plurality of audible annotations includes determining an email address associated with said first person.

4. The method of claim 1, wherein presenting said first icon provides an indication of an existence of said first plurality of annotations and of a relationship between said annotations and said first person.

5. The method of claim 3, further comprising:
    obtaining said first plurality of audible annotations.

6. The method of claim 1, further comprising:
    receiving a selection of the second icon;
    presenting a second one or more indications in response to the selection of the second icon, each of the second one or more indications associated with a respective one of the second one or more audible annotations;
    receiving a selection of one of the second one or more indications; and
    audibly presenting one of the second one or more audible annotations associated with the selected one of the second one or more indications.

7. A system for associating an annotation with a document, comprising:
    a network;
    at least one client device operably coupled to said network; and
    a server operably coupled to said network, said server adapted to:
        associate a first plurality of audible annotations with a document;
        associate a second one or more audible annotations with the document;
        associate a first person with said first plurality of audible annotations;
        associate a second person with said second one or more audible annotations;
        present the document together with a first icon associated with the first plurality of audible annotations and a second icon associated with the second one or more audible annotations;
        receive a selection of the first icon;
        present a plurality of indications in response to the selection of the first icon, each of the plurality of indications associated with a respective one of the first plurality of audible annotations;
        receive a selection of one of the plurality of indications; and
        audibly present one of the first plurality of audible annotations associated with the selected indication.

8. The system of claim 7, said server further adapted to:
    receive a selection of the second icon;
    present a second one or more indications in response to the selection of the second icon, each of the second one or more indications associated with a respective one of the second one or more audible annotations;
    receive a selection of one of The second one or more indications; and
    audibly present one of the second one or more audible annotations associated with the selected one of the second one or more indications.

9. A system for associating an annotation with a document, comprising:
    a memory;
    a communication port; and
    a processor connected to said memory and said communication port, said processor being operative to:
        associate a first plurality of audible annotations with a document;
        associate a second one or more audible annotations with the document;
        associate a first person with said first plurality of audible annotations;
        associate a second person with said second one or more audible annotations;
        present the document together with a first icon associated with the first plurality of audible annotations and a second icon associated with the second one or more audible annotations;
        receive a selection of the first icon;
        present a plurality of indications in response to the selection of the first icon, each of the plurality of indications associated with a respective one of the first plurality of audible annotations;
        receive a selection of one of the plurality of indications; and audibly present one of the first plurality of audible annotations associated with the selected indication.

10. The system of claim 9, said processor being further operative to:
receive a selection of the second icon;
present a second one or more indications in response to the selection of the second icon, each of the second one or more indications associated with a respective one of the second one or more audible annotations;
receive a selection of one of the second one or more indications; and
audibly present one of the second one or more audible annotations associated with the selected one of the second one or more indications.

11. A computer program product in a computer readable medium for associating an annotation with a document, comprising:
instructions for associating a first plurality of audible annotations with a document,
instructions for associating a second one or more audible annotations with the document;
instructions for associating a first person with said first plurality of audible annotations;
instructions for associating a second person with said second one or more audible annotations;
instructions for presenting the document together with a first icon associated with the first plurality of audible annotations and a second icon associated with the second one or more audible annotations;
instructions for receiving a selection of the first icon;
instructions for presenting a plurality of indications in response to the selection of the first icon, each of the plurality of indications associated with a respective one of the first plurality of audible annotations;
instructions for receiving a selection of one of the plurality of indications; and
instructions for audibly presenting one of the first plurality of audible annotations associated with the selected indication.

12. The computer program product of claim 11, further comprising:
instructions for receiving a selection of the second icon;
instructions for presenting a second one or more indications in response to the selection of the second icon, each of the second one or more indications associated with a respective one of the second one or more audible annotations;
instructions for receiving a selection of one of the second one or more indications; and
instructions for audibly presenting one of the second one or more audible annotations associated with the selected one of the second one or more indications.

* * * * *